United States Patent
Huang

[19]

[11] Patent Number: 6,130,609
[45] Date of Patent: Oct. 10, 2000

[54] SELF-COMPENSATIONAL AUTOMATIC EMERGENCY SIGNAL MEANS FOR VEHICLES

[76] Inventor: Ting-Lung Huang, No. 43, Tou-Nan Lane, Sa-Tien Road, Sa-Lu, Taichung Hsien, Taiwan

[21] Appl. No.: 09/267,450

[22] Filed: Mar. 12, 1999

[51] Int. Cl.[7] .................................................. B60Q 1/50
[52] U.S. Cl. ..................... 340/467; 340/468; 340/471; 340/474; 340/479; 200/61.45 R; 200/61.48; 200/61.52
[58] Field of Search ..................................... 340/467, 468, 340/471, 472, 479, 463, 474; 200/61.45 R, 61.48, 61.52, 61.49, 61.51

[56] References Cited

U.S. PATENT DOCUMENTS

| | | | |
|---|---|---|---|
| 4,284,984 | 8/1981 | Scarpino, III et al. | 340/467 |
| 5,831,521 | 11/1998 | Huang | 340/467 |
| 5,981,939 | 11/1999 | Yoon | 340/467 |

*Primary Examiner*—Nina Tong

[57] ABSTRACT

A self-compensational automatic emergency signal device includes: an inner casing having a movable weight movable in the inner casing, an outer casing disposed on an outside of the inner casing, with the inner casing pivotally secured in the outer casing and suspending on a damping oil filled in the outer casing to allow the inner casing to always horizontally float on the outer casing, whereby upon inclination of the car either climbing upwardly or downwardly on a slope, the signal device is uninfluenced by the slope; and upon an emergency braking of the car to forwardly move the weight, a sensor provided in the inner casing will be actuated to thereby light up a warning light or to sound an alarming buzzer for warning any following car.

9 Claims, 6 Drawing Sheets

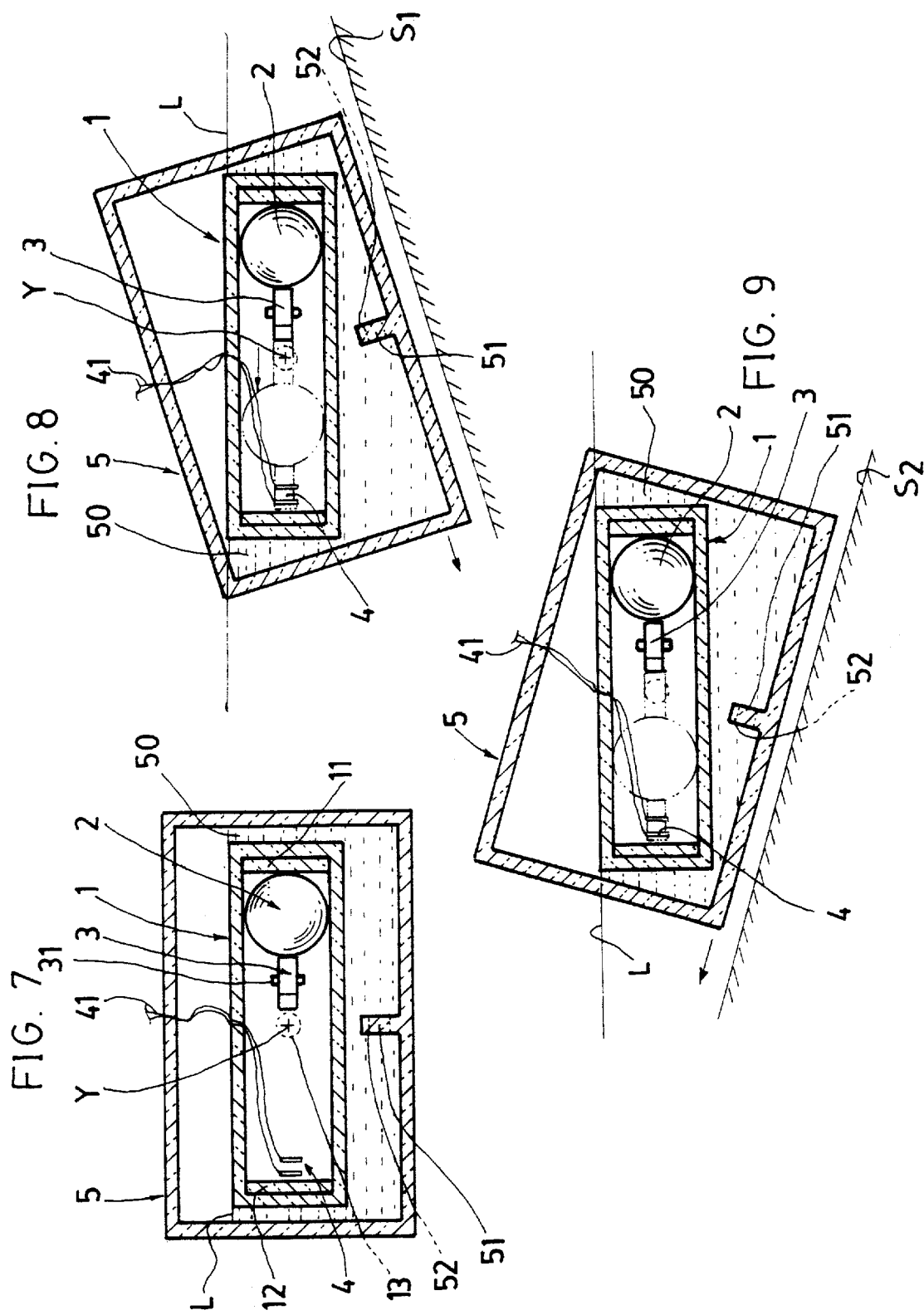

SELF-COMPENSATIONAL AUTOMATIC EMERGENCY SIGNAL MEANS FOR VEHICLES

BACKGROUND OF THE INVENTION

U.S. Pat. No. 5,831,521 to the same inventor of this application disclosed an automatic emergency signal device having a movable weight movable in a casing mounted in a vehicle, a sensor actuated by the movable weight due to inertia of the movable weight upon a sudden or emergency braking of the vehicle for sensing a trigger signal which in then treated by a controller for lighting up a warning light.

However, when the vehicle is driven to climb up a slope, the movable weight is inclined downwardly backwardly due to its gravity, thereby resisting a forward movement of the weight to actuate the sensor and the warning light and therefore influencing the precision and reliability of the signal means.

Similarly, when the car is driven down a slope, the movable weight will be suddenly rolled forwardly due to a forward inclination of the car and the signal means to cause a false actuation of the warning light, possibly losing its warning effect even an emergency braking is not yet done.

The present inventor has found the drawbacks of the conventional emergency signal means and invented the present self-compensational automatic signal means for vehicles.

SUMMARY OF THE INVENTION

The object of the present invention is to provide a self-compensational automatic emergency signal device including: an inner casing having a movable weight movable in the inner casing, an outer casing disposed on an outside of the inner casing, with the inner casing pivotally secured and suspending on a damping oil filled in the outer casing to allow the inner casing to always horizontally float in the outer casing, whereby upon inclination of the car either climbing upwardly or downwardly on a slope, the signal device is uninfluenced by the slope; and upon an emergency braking of the car to forwardly move the weight, a sensor provided in the inner casing will be actuated to thereby light up a warning light or to sound an alarming buzzer for warning any following car.

BRIEF DESCRIPTION OF THE DRAWINGS

FIG. 7 is a sectional drawing of the present invention when the vehicle is driven on a horizontal road.

FIG. 8 is a sectional drawing of the present invention when the vehicle is driven down on a slope.

FIG. 9 shows the present invention when the vehicle is driven as climbing up a slope.

DETAILED DESCRIPTION

Figure 1:
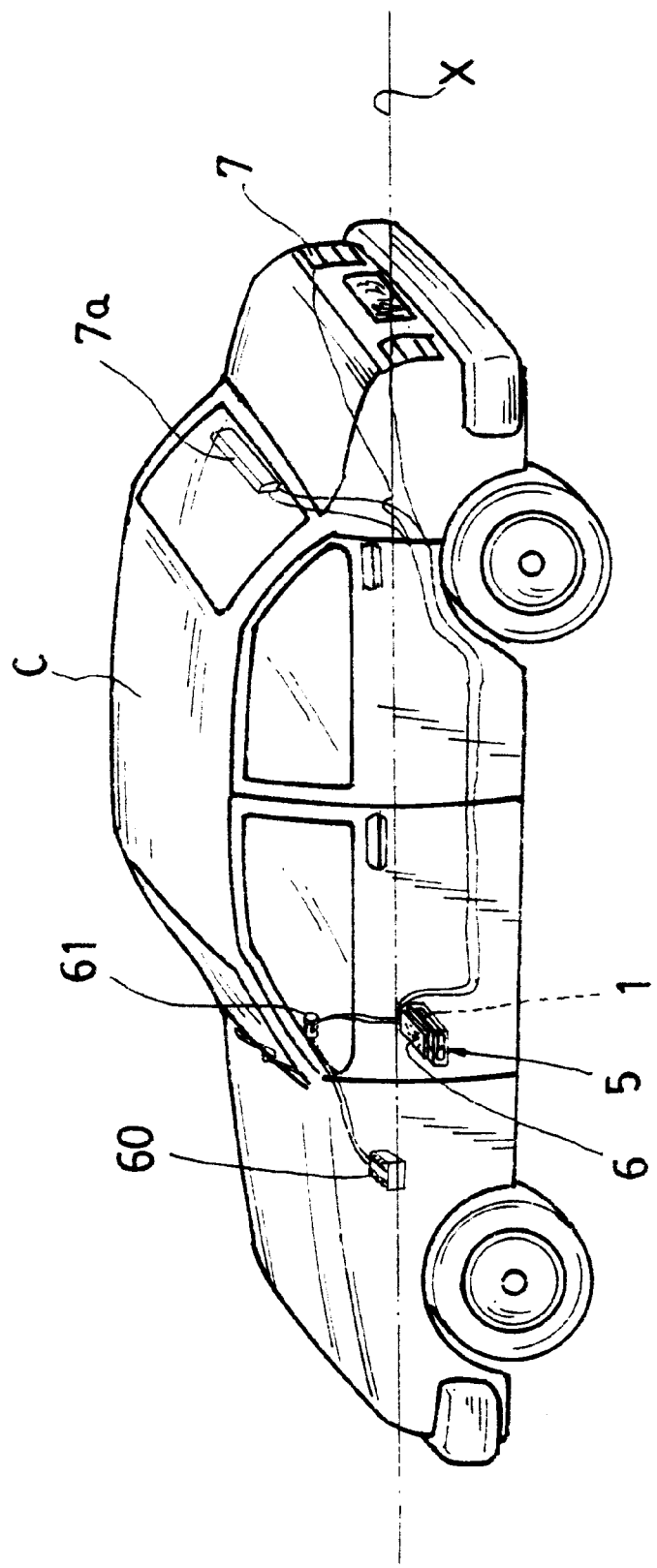
FIG. 1 is an illustration of a vehicle provided with the present invention.
Figure 2:
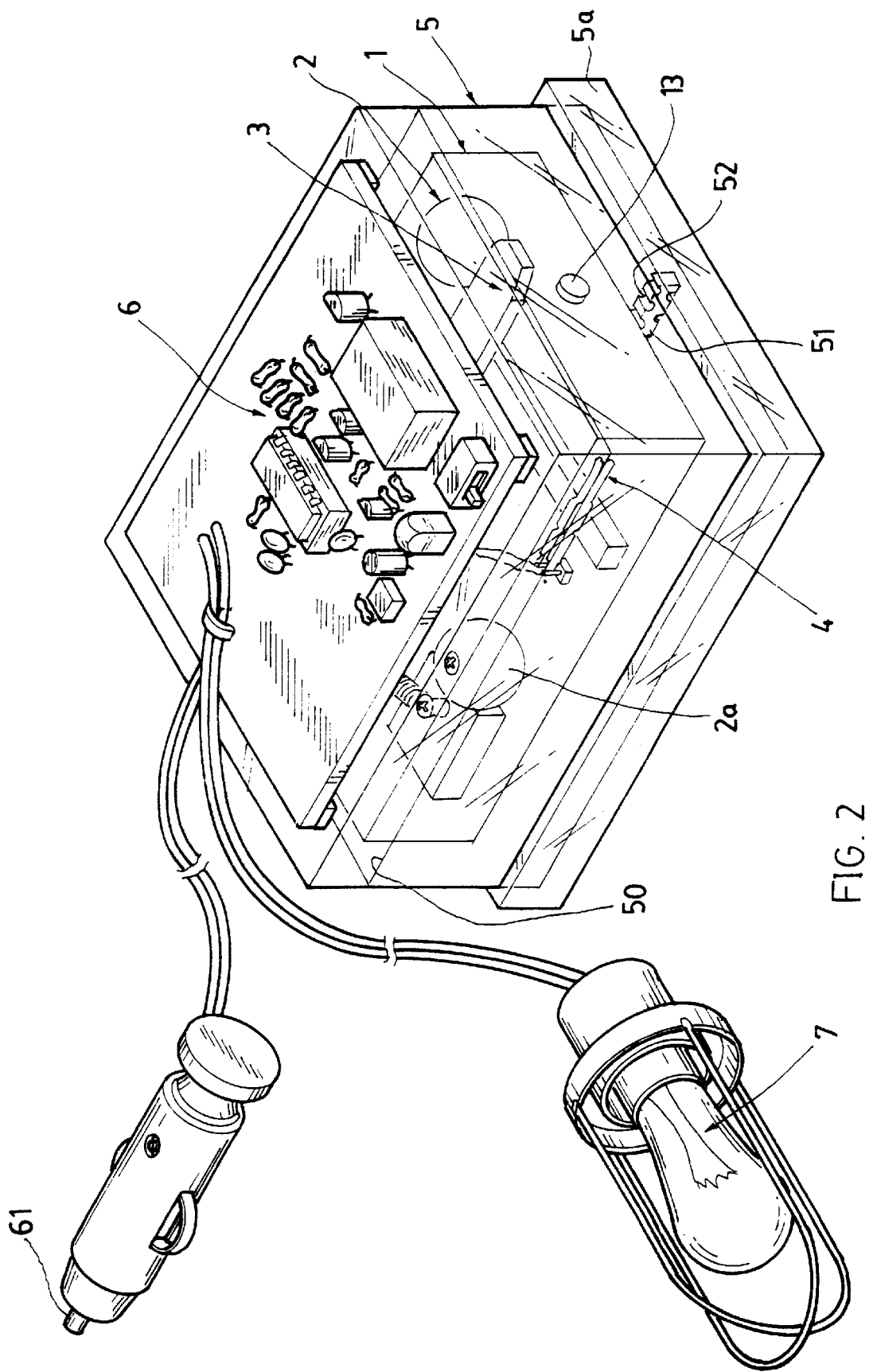
FIG. 2 is a perspective view of the present invention.
Figure 3:
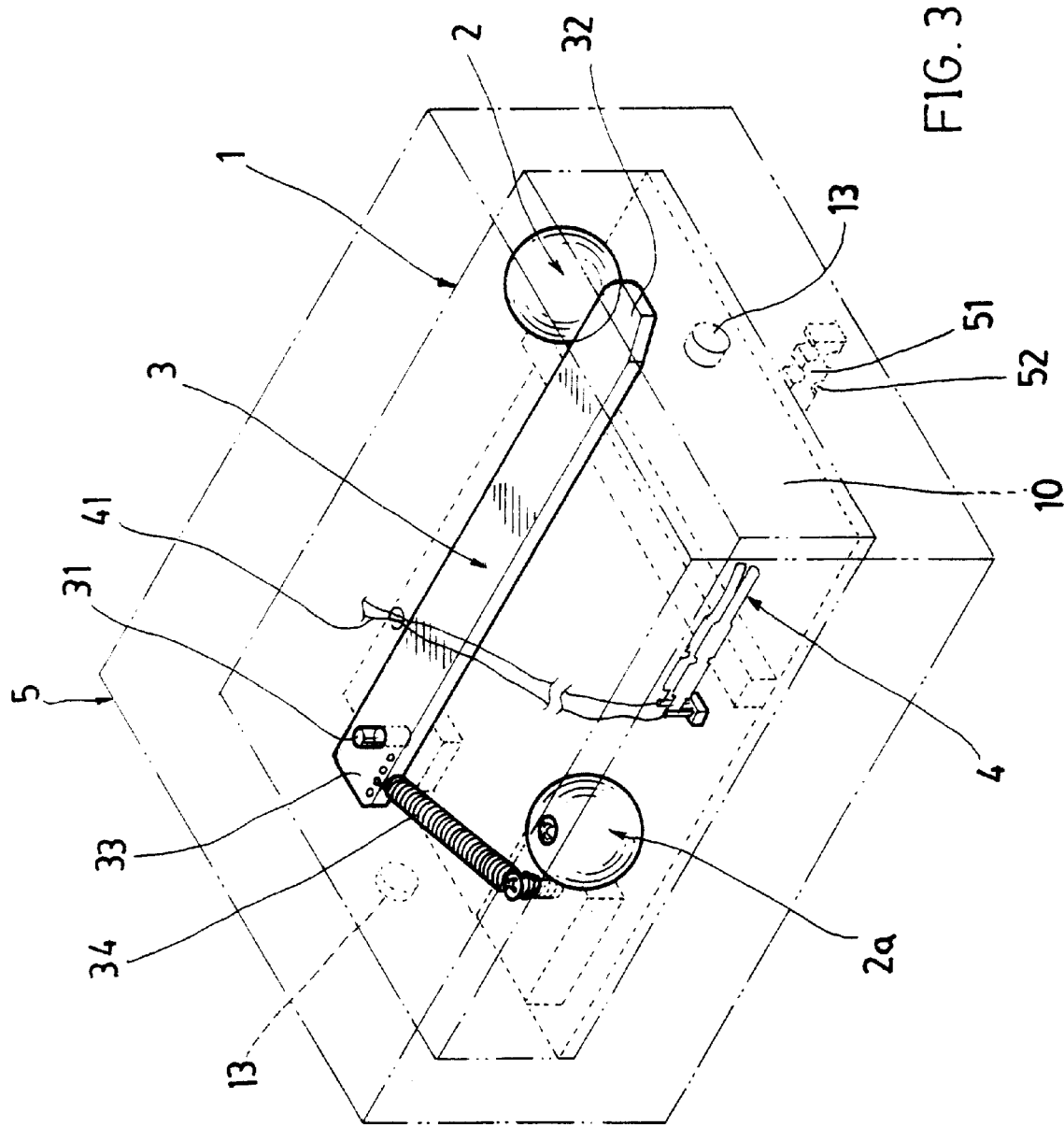
FIG. 3 shows an inner casing and its relevant elements of the present invention when driven horizontally.

As shown in the drawing figures, a self-compensational automatic emergency signal means for vehicles of the present invention comprises: an inner casing 1 pivotally secured in an outer casing 5 which is mounted on a vehicle C, a movable weight 2 movable or rolling in the inner casing 1, a counter weight 2a secured in the inner casing 1 opposite to the movable weight 2 when normally rested on a starting position S in the inner casing for a gravitational balance of the inner casing 1 and the elements of the present invention mounted thereon, a restoring lever 3 resiliently contacting the weight 2 for restoring the weight 2 towards a starting position S in the inner casing 1, a sensor 4 secured in the inner casing 1 at a target position T opposite to the starting position S and operatively actuated by the weight 2 when moving towards the target position T, due to inertial of the weight 2 upon a sudden or emergency brake of the vehicle, for sensing a trigger signal, a control circuit 6 mounted on the outer casing 5 and electrically or remotely connected with the sensor 4 for receiving and treating the trigger signal as sensed from the sensor 4, and a warning device 7 electrically connected to the controller 6 to be controlled for switching on or off the warning device 7. The inner casing 1 is floated on a damping fluid 50 as filled in the outer casing 5. The inner casing 1 is formed as a closed hollow casing and includes: a groove 10 longitudinally formed in the inner casing 1 and parallel to the longitudinal axis X of the vehicle C, a starting bumper 11 fixed in the inner casing at the starting position S where the movable weight is normally rested upon, a target bumper 12 fixed in the inner casing at the target position T where the movable weight 2 reaches due to inertia upon an emergency brake of the vehicle, and an axle 13 transversely formed on a central portion of the inner casing 1 to be pivotally mounted in the outer casing 5 along a pivoting axis Y projectively perpendicular to the longitudinal axis X of the vehicle. The bumpers 11, 12 may be made of resilient elastomers.

The movable weight 2 may be a heavy ball, roller or wheel made of metallic materials having a suitable weight which is dependent upon the moving stroke of the weight from the starting position S to the target position T, the moment of the forward running weight 2 (in direction F) when an emergency brake is actuated for suddenly stopping the vehicle, the resistance of the restoring lever 3 resiliently contacting the weight 2, and the other factors.

Figure 4:
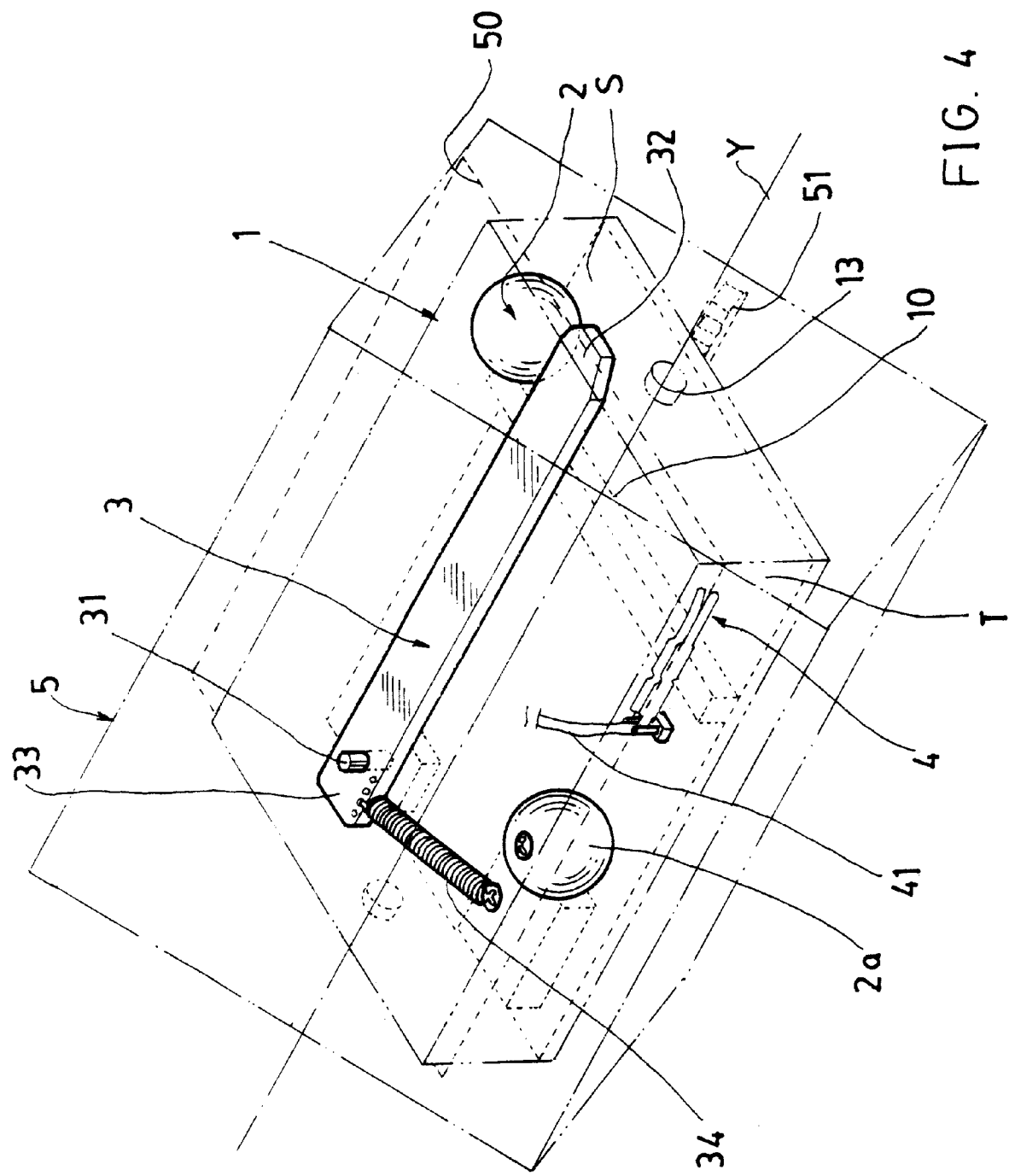
FIG. 4 is an illustration of the present invention when driven as being down on a slope.

For gravitational balance of the inner casing 1 when pivotally mounted in the outer casing 5 and suspended on the damping fluid 50 as filled in the outer casing, a counter weight 2a is fixed in the inner casing 1 opposite to the movable weight 2 which is normally rested upon the starting position S in the inner casing, allowing a constant horizontal positioning of the inner casing 1 within the outer casing 5 on or along a horizontal plane or level L of the damping fluid 50 as shown in FIGS. 7 and 4 where the inner casing 1 is floated on the damping fluid 50 in the out er casing 5.

The counter weight 2a may be made of heavy materials as the same as that of the movable weight 2.

Figure 5:
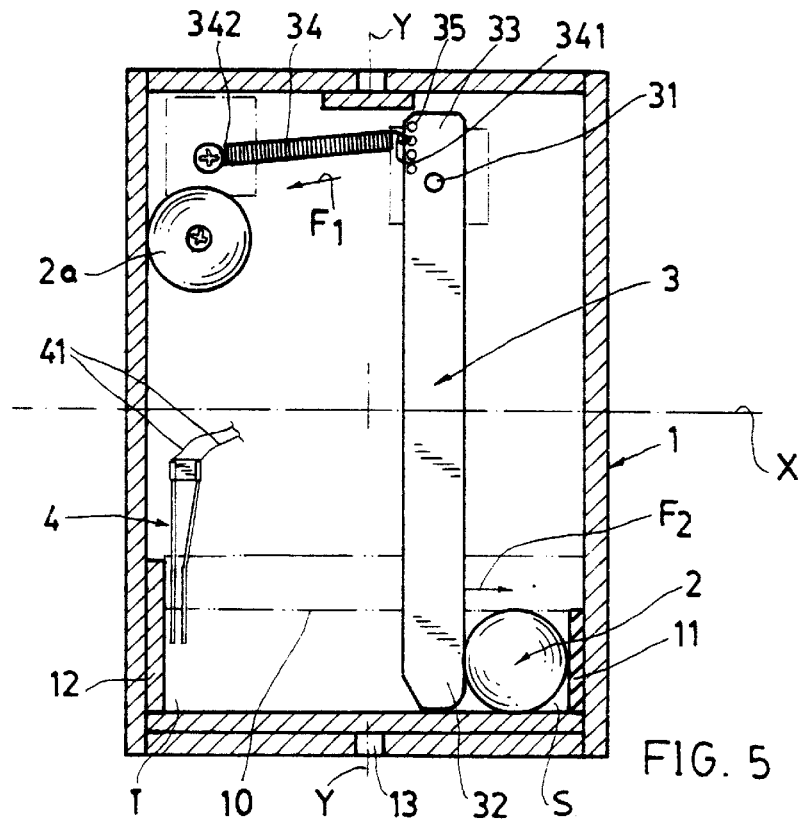
FIG. 5 is a top view of the inner casing and the elements mounted therein.
Figure 6:
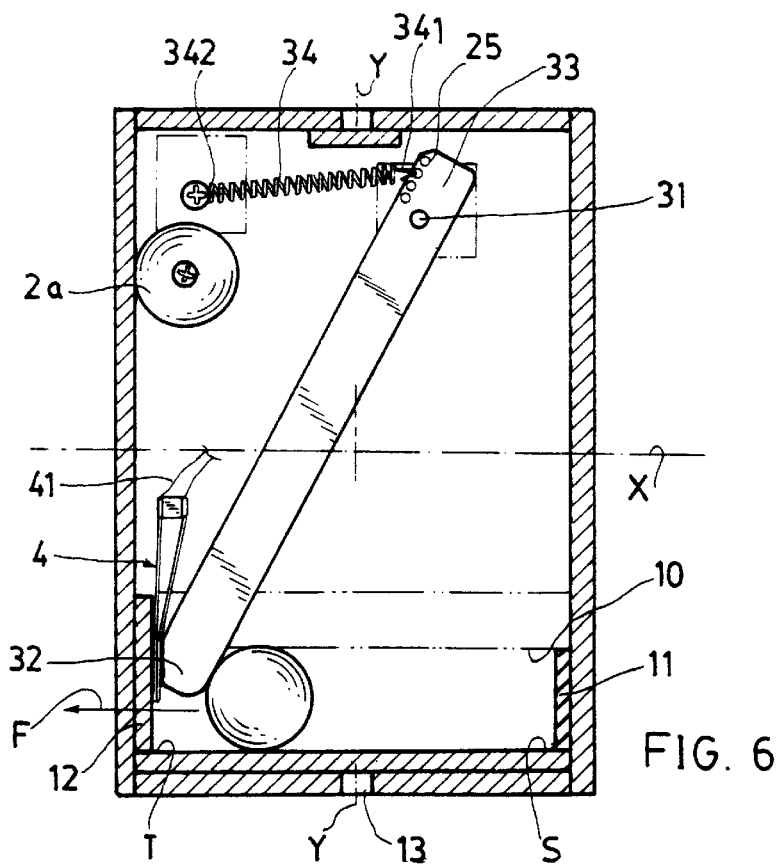
FIG. 6 is a top view of the inner casing when actuated by moving the weight forwardly.

The restoring lever 3 includes: a pivot 31 for pivotally mounting the lever 3 in the inner casing 1, a lower actuating end 32 normally resiliently contacting the movable weight 2, an upper restoring end 33 adjacent to the pivot 31 for securing a first spring end 341 of a restoring spring 34 of which the second spring end 342 is retained on and tensioned to (F1) the inner casing 1 for biasing (F2) the lower actuating end 32 for resiliently contacting the weight 2 to have a tendency to be restored towards the starting position S (FIG. 5).

The upper restoring end 33 of the lever 3 may be drilled with plural perforations 35 for adjustably securing the spring end 341 of the restoring spring 34. The resilience of the spring 34 is well designed or set, not to retard the forward running of the weight 2 upon emergency brake of a car, but being ensured to normally restore the weight backwardly to its original starting position S if not encountering the situation of emergency brake.

The sensor 4 may be a trigger or micro switch, a photo sensor, a reed switch and the others; and is secured in the inner casing 1 at the target position T opposite to the starting position S.

The sensor 4 is electrically connected to the control circuit 6 by fine wires 41 or is remotely connected to the control circuit 6 by radio transmission and receiving systems (not shown).

The control circuit 6 may be secured on the outer casing 5 and is electrically connected by a plug 61 to the power source 60 which may be a car battery formed in situ within the car.

The control circuit 6 is electrically connected to the warning device 7 which may be a lamp or a light or may be modified to be a buzzer 7a, preferably mounted on a rear portion of the car for reminding or alerting the following car.

The outer casing 5 has a baffle 51 formed on a bottom in the casing 5 for dampening the fluid flow of the damping fluid 50 as filled in the outer casing 5 to increase the sensitivity of the present invention. The casings 1, 5 may be formed as parallelepiped or other shapes.

A plurality of holes 52 are formed in the baffle 51 for maintaining a streamflow or smooth fluid flow through the baffle when the car is driven on a down slop (S1) as shown in FIG. 8; or driven on an upward slope (S2) as shown in FIG. 9.

The outer casing 5 may be detachably embedded or securable in a base 5a which is fixed on the car for maintenance purpose.

The control circuit 6 may be an integrated circuit, a micro processor or an electronic circuit; and will receive, amplify and treat the trigger signal as transmitted from the sensor 4 to actuate the warning device 7, 7a for optical warning or audible alarming for the trailing or following car.

Accordingly, when a car as provided with the present invention is driven on any sloping roads as shown in FIGS. 4, 8, and 9, the inner casing 1 is constantly positioned in a horizontal level L to act like driving on a horizontal road (FIG. 7), thereby causing no influence to the precision or sensitivity of the emergency signaling effect as effected by the present invention even driven on a sloping road.

If the emergency braking is done intermittently for preventing locking a car wheels, the warning device 7 (light or lamp) may be actuated within a pre-determined time interval through a time-delay circuit (not shown) to prevent a shortened warning time.

The damping fluid 50 may be well selected for maintaining an optimum fluidity, viscosity of the fluid. A lube oil or other suitable damping fluids may be chosen for the present invention.

The present invention may be modified without departing from the spirit and scope of the present invention.

I claim:

1. An automatic emergency signal means for vehicles comprising:

an outer casing mounted in a vehicle and having a damping fluid filled in said outer casing;

an inner casing pivotally secured in said outer casing, said inner casing floated on said damping fluid to be constantly positioned at a horizontal plane within said outer casing;

a movable weight movable or rolling in said inner casing and normally rested at a starting position in said inner casing;

a counter weight secured in said inner casing opposite to said movable weight when normally rested on the starting position, said counter weight gravitationally balancing said inner casing in commensuration with said movable weight to allow said inner casing to be horizontally positioned in said outer casing;

a restoring lever pivotally secured in said inner casing and resiliently contacting said movable weight for normally restoring said movable weight towards the starting position in said inner casing;

a sensor secured in said inner casing at a target position opposite to said starting position in said inner casing, and operatively actuated by said movable weight when forwardly moved towards the target position due to inertia of the movable weight upon an emergency braking of the vehicle;

a control circuit electrically connected to said sensor and a power source for receiving and treating a trigger signal as transmitted from said sensor when actuated upon the emergency braking of the vehicle; and a warning device including a light and a buzzer electrically connected to said control circuit and operatively actuated by said control circuit upon the emergency braking of the vehicle for warning a following car.

2. An automatic emergency signal means according to claim 1, wherein said inner casing has an axle transversely formed on a central portion of said inner casing for pivotally mounting said inner casing in said outer casing, said axle defining a pivoting axis projectively perpendicular to a longitudinal axis longitudinally defined at a central portion of the vehicle.

3. An automatic emergency signal means according to claim 2, wherein said inner casing has a groove longitudinally formed therein, said groove being parallel to said longitudinal axis of said vehicle and provided for moving said movable weight in said groove.

4. An automatic emergency signal means according to claim 1, wherein said outer casing includes a perforated baffle formed on a bottom of said outer casing for a smooth fluid flow of said damping fluid in said outer casing.

5. An automatic emergency signal means according to claim 1, wherein said sensor is electrically connected to said control circuit mounted on said outer casing by fine wires.

6. An automatic emergency signal means according to claim 1, wherein said sensor is remotely connected to said control circuit mounted on said outer casing.

7. An automatic emergency signal means according to claim 1, wherein said sensor is selected from: a trigger switch, a photo sensor, a read switch, and a micro switch.

8. An automatic emergency signal means according to claim 1, wherein said restoring lever includes: a pivot for pivotally mounting the lever in the casing, a lower actuating end normally resiliently contacting the movable weight, an upper restoring end formed on an upper portion of the lever having a restoring spring connected on the upper restoring end, and the restoring spring retained in and tensioned to an upper portion of the casing for biasing the lower actuating end for resiliently contacting the weight to have a tendency to be restored to the starting position.

9. An automatic emergency signal means according to claim 1, wherein said damping fluid is a lube oil.

* * * * *